United States Patent [19]
Burke

[11] Patent Number: 6,113,789
[45] Date of Patent: Sep. 5, 2000

[54] PASTEURIZATION PROCESS

[75] Inventor: Dennis A. Burke, Olympia, Wash.

[73] Assignee: Western Environmental Engineering Company, Olympia, Wash.

[21] Appl. No.: 09/354,967

[22] Filed: Jul. 16, 1999

Related U.S. Application Data

[60] Provisional application No. 60/093,485, Jul. 20, 1998.

[51] Int. Cl.[7] ................................................. C02F 11/18
[52] U.S. Cl. ........................... 210/609; 210/613; 210/623; 210/630; 210/766
[58] Field of Search ..................... 210/608, 609, 210/612, 613, 615–617, 623–625, 629–631, 764, 766

[56] References Cited

U.S. PATENT DOCUMENTS

| | | | |
|---|---|---|---|
| 4,289,625 | 9/1981 | Tarman et al. | 210/613 |
| 4,295,571 | 10/1981 | Jacob et al. | 210/764 |
| 4,609,469 | 9/1986 | Keoteklian | 210/609 |
| 4,710,300 | 12/1987 | Kristoufek | 210/603 |
| 5,015,384 | 5/1991 | Burke | 210/603 |
| 5,405,536 | 4/1995 | Christy | 210/764 |
| 5,422,015 | 6/1995 | Angell et al. | 210/764 |
| 5,540,839 | 7/1996 | Pirt | 210/612 |
| 5,670,047 | 9/1997 | Burke | 210/603 |
| 5,746,919 | 5/1998 | Dague et al. | 210/603 |
| 5,888,453 | 3/1999 | Luker | 422/38 |

*Primary Examiner*—Thomas G. Wyse
*Attorney, Agent, or Firm*—Christensen O'Connor Johnson & Kindness PLLC

[57] ABSTRACT

An anaerobic process for digesting organic waste solids to produce residual solids having low levels of pathogens so as to meet regulatory Class A requirements involves a pasteurization step to reduce pathogen levels and digestion of the pasteurized material to reduce the solids volume.

14 Claims, 3 Drawing Sheets

PASTEURIZATION PROCESS

This application claims the benefit of the filing date of U.S. provisional application Ser. No. 60/093,485 filed Jul. 20, 1998.

FIELD OF THE INVENTION

The present invention relates to an anaerobic treatment process for digesting organic substrates and producing residual solids containing reduced concentrations of pathogens.

BACKGROUND OF THE INVENTION

Anaerobic digestion is used to convert a variety of organic materials to gas and soluble constituents. Anaerobic digestion is commonly used to convert a fraction of sewage sludge, animal manure, and other putrid organic slurries containing substantial quantities of pathogenic bacteria, viruses, fungi, and parasites to methane gas and soluble products. Conversion of sewage sludge, or other waste solids to gas and soluble constituents lowers the cost of solids disposal by reducing the mass of solids requiring disposal. Examples of process that are useful for converting organic materials to gas and soluble constituents include the retained biomass processes described in U.S. Pat. Nos. 5,015,384 and 5,670,047 by the inventor of the subject application. The '384 patent describes a retained biomass process similar to the one illustrated in FIG. 1. In such a process, an influent slurry 1 is delivered at a rate Q to anaerobic reactor 8. Solids, comprising partially digested solids and anaerobic bacteria, and liquid and soluble products of digestion are delivered via line 2 to a separator 9 where the solids are separated from the liquid and soluble products of digestion. The '384 patent describes that the solids are either returned to anaerobic Retained biomass systems substantially improve the economics of anaerobic digestion. The digestor size can be significantly reduced while improving the percent solids converted to gas and soluble products. In a retained biomass system solids must be wasted from the system on a periodic basis to avoid their undesirable build up. Referring to FIG. 1 and 2, solids can be wasted from separator 9 along line 5 or from the thickened return solids stream 3 shown in FIG. 1. Solids can also be wasted from the digestor 8 or from line 2 as shown in FIG. 2. Typically, it is more economical to waste the concentrated solids from the thickened solids stream 3 or directly from the separator 9 shown in FIG. 1, as compared to wasting the less concentrated digestor solids as shown in FIG. 2.

In addition to the volume and mass of residual waste solids, the cost of disposing waste solids is also influenced by the quality of solids requiring disposal. Solids, which have lower concentrations of bacteria and viral pathogens, can be disposed at less cost than solids containing higher concentrations of pathogenic organisms. Current regulations (EPA—40 CFR Part 503) define Class A or "exceptional quality" biosolids as those waste solids containing a reduced quantity of pathogenic bacteria such as salmonella, and fecal coliform. Class A biosolids can be produced through a variety of means including:

1. Disinfection by holding the waste solids (biosolids) at an elevated temperature (above 50° C.) for a prolonged period of time. Shorter detention times are achieved at higher temperatures. Pasteurization is achieved by retaining the solids or slurry for 30 minutes or more at 70° C. or higher.
2. Raising the pH above 12 for 72 hours at an elevated temperature, or drying to 50% solids concentration.
3. In vessel or aerated composting for three days at 55° C.
4. Windrow composting at 55° C. for 15 days
5. Heat drying at 80° C.
6. Heat treatment of liquid biosolids to 180° C. for 30 minutes.
7. Aerobic thermophilic digestion at 55° C. for 10 days
8. Beta ray irradiation
9. Gamma ray irradiation As can be observed from the list above, the waste biosolids must have the pH or the temperature elevated for prolong periods of time to achieve the desired pathogen reduction. The cost of achieving the desired pathogen reductions according to the above methods is directly related to:

1. The energy or chemical cost required to elevate and maintain the temperature of the waste biosolids; and
2. The reactor size required to hold the waste solids for the required period of time.

The quantity of chemicals used, the energy required, and holding vessel size, are each dependent on the quantity of solids that must be processed to reduce the pathogen concentration.

Specific methods of producing anaerobically digested "Class A" biosolids include the following processes:

1. Plug flow anaerobic thermophillic digestion or simulated plug flow digestion through a series of completely mixed thermophiluic digesters. In this type of process the entire influent flow is heated to thermophlllic temperatures. Heat losses from the digestors can be significant, since the volume to surface area required for multiple digestors is low. High effluent organic acids and ammonia concentrations, and the poor dewaterability of the residual solids are significant disadvantages of anaerobic thermophillic digestion or simulated plug flow digestion.
2. Batch pasteurization of the entire influent flow prior to anaerobic digestion is a commonly used practice. However, pasteurization of the entire influent flow prior to anaerobic digestion is expensive since the entire viscous flow must be pasteurized. The procedure requires large quantities of energy for transporting and heating the viscous influent slurry.
3. Thermophillic anaerobic digestion followed by mesophillic anaerobic digestion (Dague, et al #5,746,919) has been described as useful to achieve Class A biosolids. However, in order to meet the strict requirements of EPA—40 CFR Part 503, in such a process the thermophillic digestor should operate in a plug flow mode to prevent short-circuiting, i.e. passage of a portion of the biosolids without being exposed to the treatment conditions for a sufficient period of time to effect the desired results. Again, with this type of process, the entire flow of biosolid stream must be heated to thermophillic temperatures and maintained at those temperatures for a considerable period of time, generally exceeding 7 days in the thermophillic reactor and 12 days in the mesophillic digestor. Such long retention times and large volumes contribute significantly to the overall cost of the process. In addition, two biomasses, mesophillic and thermophillic, are grown, thus reducing the mass converted to gas while increasing the mass to be disposed.
4. Thermophillic aerobic digestion followed by mesophillic anaerobic digestion also provides a process to achieve Class A biosolids. However, in order to meet the strict requirements of EPA—40 CFR Part 503, in this process the hermophillic aerobic digestor is generally operated in the plug flow mode or as a sequencing batch reactor to prevent short-circuiting. Again the entire flow must be heated to thermophillic temperatures and maintained at those temperatures for a considerable period of time, generally exceeding 5 days in the aerobic reactor, and 12 days in the anaerobic digestor. Costs associated with the heating, transporting and storing the process stream can be significant. In addition, a significant portion of the methane gas generating potential is lost in the aerobic portion of such process.

5. U.S. Pat. No. 5,888,453 describes a continuous flow pasteurization process for sewage sludge. The process described in the '453 patent involves raising the temperature of the sludge by passing the sludge through at least one heat exchanger supplied with a heating fluid. The sludge at the elevated temperature is delivered to a detention tank where it is held above a predetermined temperature for a predetermined period of time to effect pasteurization. The '453 patent describes that the pasteurized sludge can be fed to a second anaerobic reactor for further digestion, followed by delivery to a dewatering system.

There continues to be a need for an energy efficient anaerobic digestion process capable of effectively and efficiently digesting organic substrates and producing residual solids that contain reduced quantities of pathogens so as to be classified as Class A or "exceptional biosolids" by the EPA.

SUMMARY OF THE INVENTION

The present invention provides a method for anaerobically digesting organic substrates and producing residual solids that contain pathogens at a level that allows the residual solids to be classified as Class A biosolids. The method concentrates digested products which reduces the volume of material that must be treated to reduce the pathogen levels. Reducing the volume of material that must be treated provides cost savings associated with reduced energy costs and equipment costs. Steam injection is relied upon to treat the residual solids to reduce the pathogen levels. Steam is a relatively inexpensive source of heat and also provides a source of fluid to dilute the residual solids so that they can be subsequently treated in an additional anaerobic reactor to further reduce the solids volume.

An anaerobic process in accordance with the present invention includes the steps of digesting an organic substrate in a first anaerobic reactor to provide solids and liquid products of digestion. A sludge is formed from the solids and liquid products of digestion by separating solids from the liquid products of digestion. In a preferred embodiment, the sludge has a solids content ranging between about 4 to about 12 weight percent, more preferably about 6 to about 10 weight percent. A portion of the sludge is returned to the first anaerobic reactor. Another portion of the sludge is pasteurized by elevating the temperature of the sludge through the injection of steam into the sludge. The pasteurized sludge is then anaerobically digested to further reduce the solids content of the sludge.

In a preferred embodiment, the injection of steam dilutes the sludge to a solids content of less than about 6 percent by weight, preferably less than 4 percent by weight, before it is treated in the second anaerobic reactor. It is preferred to dilute the sludge to a solids content less than about 6 percent by weight so that the sludge can be readily transported to and mixed in a second anaerobic digestor without the expenditure of excess energy and the costs associated therewith. In accordance with on embodiment of the present invention, inorganic solids and refractory solids can be removed from the first anaerobic reactor and may be directly disposed of, or may be pasteurized prior to disposal.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
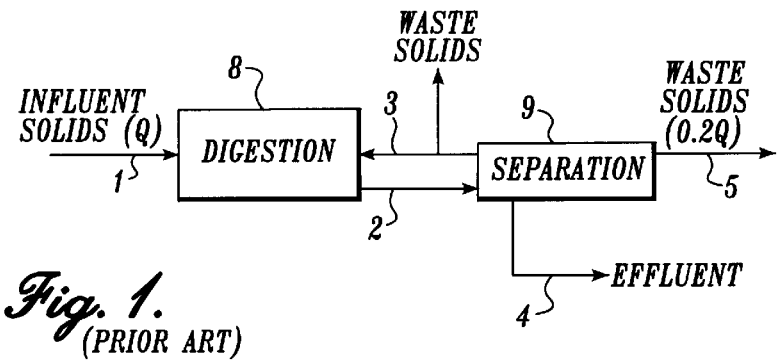
FIG. 1 is a flow diagram of a prior art retained biomass anaerobic digestion process.
Figure 2:
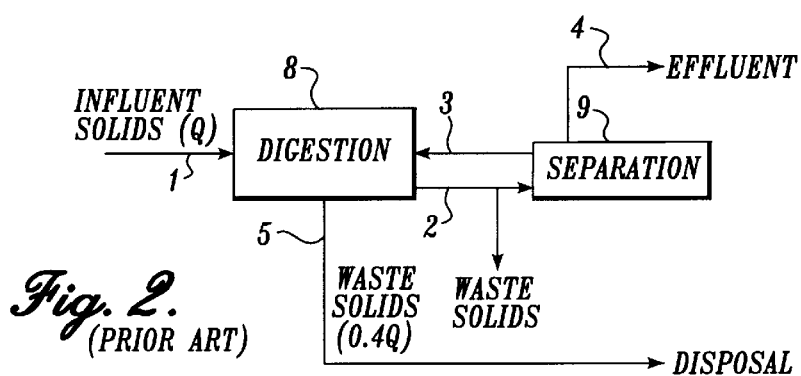
FIG. 2 is an flow diagram of a modification to the prior art retained biomass anaerobic digestion process of FIG. 1.
Figure 3:
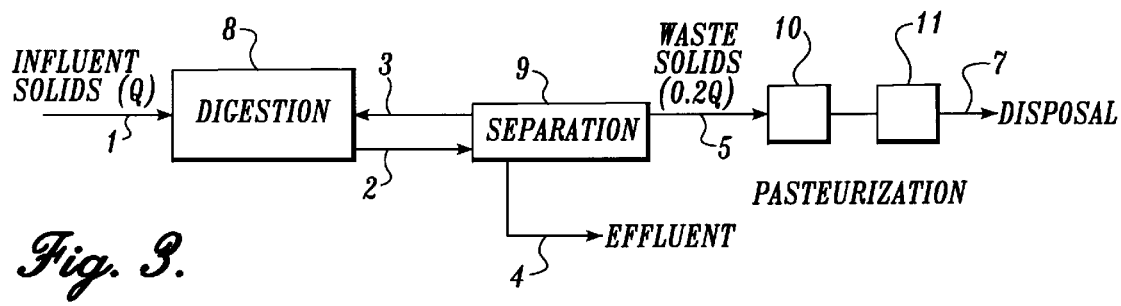
FIG. 3 is flow diagram of a anaerobic digestion process of the present invention.

Referring to FIG. 3 a portion of an embodiment of an anaerobic digestion process in accordance with the present invention is illustrated. While the present invention is described with reference to specific embodiments, it should be understood that other arrangements for carrying out the present invention are possible. U.S. Pat. Nos. 5,015,384 and 5,670,047 describe anaerobic digestion processes employing retained biomass and are herein incorporated by reference. In FIG. 3, the solids comprising raw sewage or other waste solids material including organic material are delivered via line 1 to a first anaerobic reactor 8 where the solids are subjected to anaerobic treatment conditions including contact with anaerobic biomass. The raw material may be pretreated by grinding, heat treatment, chemical treatment, or lysing of cellular material. Suitable anaerobic reactors include retained biomass reactors (fixed film, carrier assisted, sequencing batch, UASB, SBR, and the like), completely mixed or plug flow, operated in the mesophillic, thermophillic psychrophillic modes, or phase separated processes.

The digestion process produces gas, partially digested solids, and liquid products of digestion that include soluble products of digestion. The solids and liquid products of digestion are delivered via line 2 to a separator 9 where the solids and liquid products are separated to provide a concentrated solids stream in line 5 having a solids content of about 4 to about 12 weight percent, preferably about 6 to about 10 weight percent. Examples of suitable separators include flotation separators, centrifuges, clarifiers, plate separators, gravity belts, cyclones, membranes, filters, or any number of a variety of solid-liquid separators. If a retained biomass system is employed for the anaerobic reactor, a greater percentage of the influent solids are converted to gas, rather than anaerobic biomass, since bacteria are retained in the system through the use of a separator 9 and a recycle stream 3. Solids can be wasted from the system as a separated concentrate via line 5. By way of example the volume of stream 5 ranges from about 10 to about 50 percent of the influent volume. The remaining 50 to 90 percent of the volume may be discharged as liquid effluent via line 4.

The process of separating solids from the first anaerobic digestor's mixed liquor not only concentrates the solids, it also removes liquid containing inhibitory products of digestion from the pasteurization and digestion of the pasteurized solids as described in more detail below. Pasteurization at elevated temperatures enhances the release of inhibitory products of digestion that have not been removed from the digested liquor. Although release of inhibitory products such as ammonia and sulfide at elevated temperatures enhances pasteurization, it inhibits, and may prevent subsequent anaerobic digestion of the pasteurized solids. Removing the inhibitory products of digestion in the separator's liquid stream, prior to pasteurization reduces the risk that such inhibitory products will have an adverse effect on the digestion of the pasteurized solids.

Waste solids in line 5 are delivered to a pasteurization system where the solids are pasteurized to destroy bacteria, viruses, and parasites. Pasteurization consists of two distinct steps; the killing and lysing of organisms (schematically illustrated as occurring at 10) and the storage of the pathogens under destructive conditions for a period of time sufficient to maximize pasteurization (schematically illustrated as occurring at 11). It should be understood that pasteurization 10 and retention 11 may be accomplished in the same vessel or separate vessels, or in a circulation system between vessels.

In accordance with the present invention, organism destruction is preferably accomplished by injection of steam into the solids stream to elevate the temperature to above pasteurization temperatures. Direct steam injection is the preferred method since it can be used to dilute the thickened solids to a solids content of less than about 6 percent, preferably less than about 4 percent by weight. At this reduced solids level, the solids can be more easily contacted with the biomass in the subsequent re-digestion step as compared to a substrate having a solids content higher than about 6 weight percent. In addition steam is a relatively inexpensive source of thermal energy that is usually readily available on site. After the steam is injected using conventional equipment, the solids can be retained for a predetermined time to effect pasteurization. Such retention can be accomplished through the use of tanks or other vessels such as pipelines.

Figure 4:
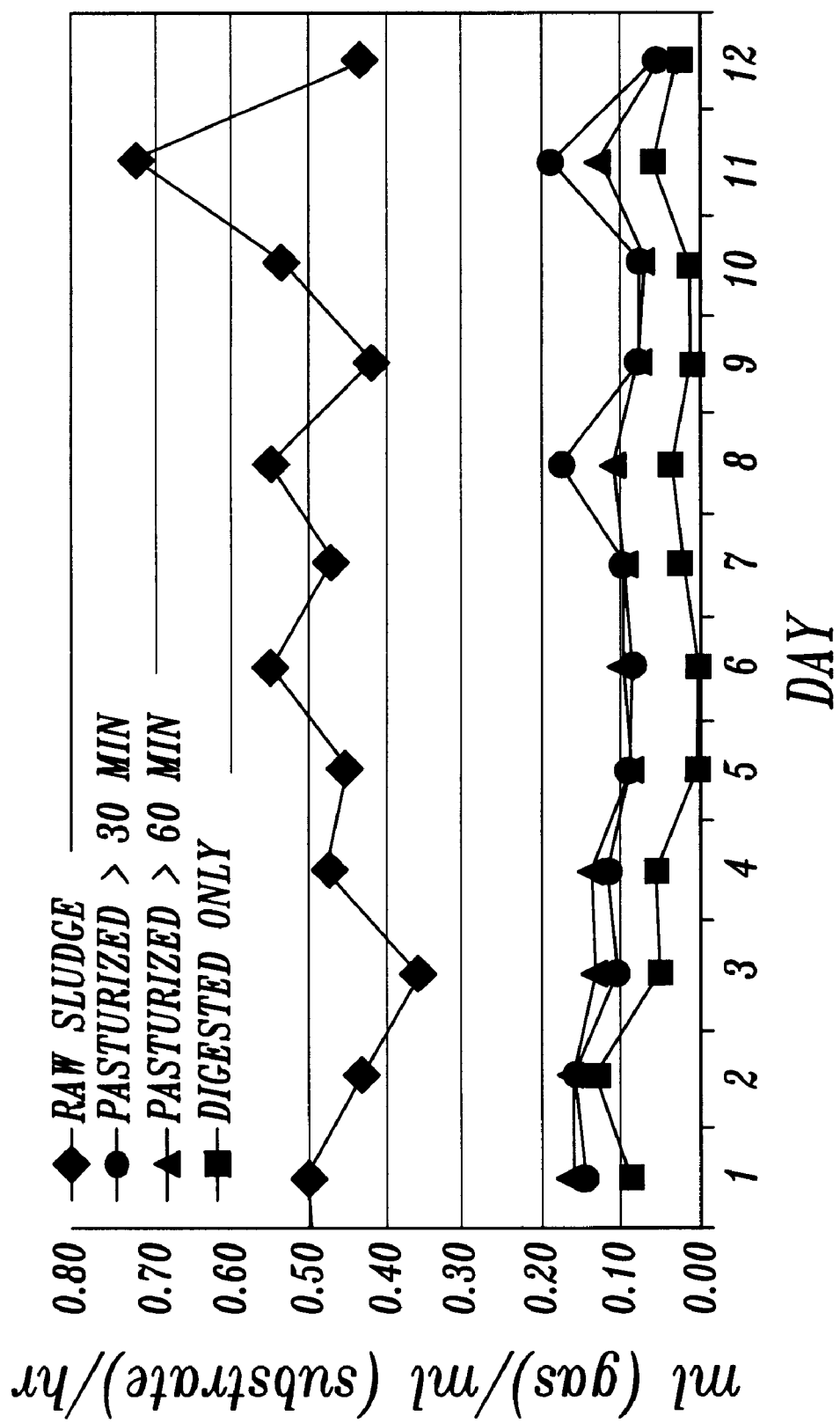
FIG. 4 is a graph illustrating the relative gas production from sludges that have and have not been treated in accordance with the present invention.

While testing the arrangement shown in FIG. 3, it was observed that the pasteurization step produced a residual solids product that had obnoxious odors and was not completely stabilized. It was observed that the pasteurized product could be re-digested to produce a stabilized, odor free product containing even less volatile solids. As shown in FIG. 4, it was found that a significant amount of gas could be produced from the pasteurized residual solids product. Calculation of the amount of gas produced indicated that the volatile solids could be reduced an additional 10 to 20 percent through digestion of the pasteurized material. The product produced by re-digestion was found to be fully stabilized.

Figure 5:
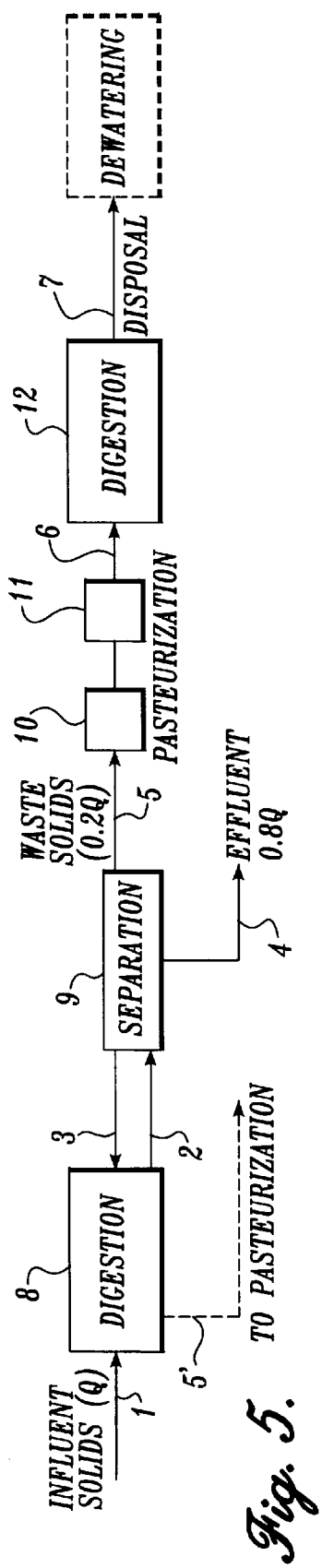
FIG. 5 is a flow diagram of an alternative embodiment of an anaerobic digestion process of the present invention.
Figure 6:
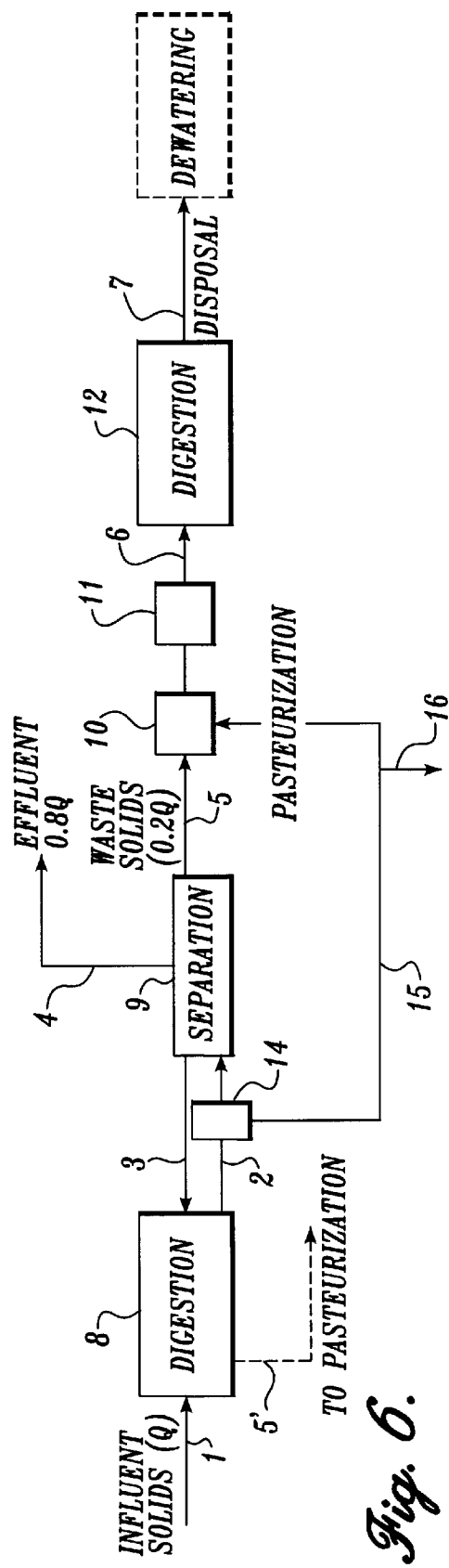
FIG. 6 is a flow diagram of another alternative embodiment of an anaerobic digestion process of the present invention.

An embodiment of the full anaerobic digestion process of the subject invention is described below with reference to FIGS. 5 and 6 where the re-digestion system is illustrated.

In the subject process, as described above, waste solids enter a digestor 8 via line 1, where the solids are converted to gas, partially digested constituents, soluble constituents, and anaerobic bacteria. The process preferably includes a separator 9, that concentrates the digested solids in line 2 through separation and then wastes a portion of the solids via line 5 and recycles a portion to digestor 8 via line 3. Liquid effluent is discharged along line 4 from separator 9. In order to prevent the build-up of inorganic and refractory solids, such solids can be wasted from line 2, or through the less efficient wasting from the anaerobic digestor 8 via line 5'. The waste solids in line 5 are pasteurized at 10 and 11 to effectively destroy the influent pathogens and anaerobic bacteria cultured in the first digestor 8. The pasteurized slurry is then directed via line 6 to second anaerobic reactor 12 for further digestion. Because the waste solids in line 5 have been diluted by the injected steam, the solids content of the slurry is preferably less than about 6, and more preferably less than about 4 weight percent which is a slurry that can be readily mixed and contacted with active biomass in second anaerobic digestor 12. Second anaerobic digestor preferably contains an anaerobic culture free of pathogens. The second anaerobic reactor can incorporate a second separator (not shown) or inorganic solids removal device (not shown) to improve its efficiency. The solids digested in anaerobic reactor 12 can be discharged along line 7 or dewatered in a separate dewatering device. The highly concentrated solids produced in digestor 12 can be more easily and effectively dewatered since the solids concentration is higher and more completely stabilized than conventionally digested solids.

The described process is expected to increase the volatile solids destruction from a typical value of 55% in a conventional digestor to 80% or 85% (70 to 80% in digestor 8 and 10 to 15% in digestor 12), while producing an odor free Class A product for ultimate disposal.

An alternative embodiment of the present invention is described with reference to FIG. 6. In that process the efficiency of the first anaerobic reactor system is improved by removing a portion of the inorganic and refractory organic solids mechanically in separator 14 positioned in line 2. Separator 14 may be any of a series of devices or screens effective to remove inorganic solids and/or refractory organic materials or a combination of both. The refractory organic and inorganic materials may be discharged separately along line 16 or delivered to the pasteurization system along line 15. The inorganic and refractory organic material will not adversely effect the performance of anaerobic reactor 12 if such material is not a retained biomass system.

The inventor observed that the pasteurization process carried out in accordance with the present invention destroyed the anaerobic bacteria and pathogens created, or maintained in the first anaerobic reactor. The destroyed bacteria then became substrate for anaerobic bacteria maintained in the second anaerobic reactor. Under preferred conditions the anaerobic bacteria maintained in the second anaerobic digestor would be a culture relatively free of pathogens. A much smaller quantity of bacteria must be cultured in the second anaerobic digestor to degrade the substrate delivered to the second anaerobic reactor since the substrate concentration is much lower.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An anaerobic process for digesting organic substrates comprising:

digesting an organic substrate in a first anaerobic reactor to provide solids and liquid products of digestion;

forming a sludge having a solids content ranging from about 4 to about 12 weight percent by separating the solids from the liquid products of digestion;

returning a portion of the sludge to the first anaerobic reactor;

pasteurizing a portion of the sludge by elevating the temperature of the sludge through the injection of steam into the sludge; and anaerobically digesting a portion of the pasteurized sludge.

2. The method of claim 1, wherein the injection of steam dilutes the sludge to a solids content less then about 6 percent by weight.

3. The method of claim 1, further comprising removing inorganic solids and/or refractory solids from the first anaerobic reactor.

4. The method of claim 3, further comprising discharging a portion of the removed inorganic solids and/or refractory solids.

5. The method of claim 3, wherein a portion of the removed inorganic solids and/or refractory solids from the first anaerobic reactor are pasteurized subsequent to their removal from the first anaerobic reactor.

6. The method of claim 1, wherein the first anaerobic reactor comprises a fixed film, sludge bed, sludge blanket, completely mixed, plug flow, phase separated, staged, carrier assisted, batch, or sequencing batch anaerobic reactor.

7. The method of claim 6, wherein the reactor is operated at mesophillic, thermophillic or psychrophillic temperatures.

8. The method of claim 1, wherein the pasteurized sludge is anaerobically digested in a second reactor comprising a fixed film, sludge bed, sludge blanket, completely mixed, plug flow, phase separated, staged, carrier assisted, batch, or sequencing batch anaerobic reactor.

9. The method of claim 1, wherein the solids are separated from the liquid products of digestion in a separator comprising a clarifier, centrifige, cyclone, plate separator, gravity belt, membrane, filter, flotation separator or a combination of such separators used with or without chemical, mechanical, or electrical flocculating aids.

10. The method of claim 9, wherein the separator and first anaerobic digestor are contained within the same vessel.

11. The method of claim 1, wherein pasteurizing of a portion of the sludge is carried out in a pasteurization vessel and a retention vessel that may be separate vessels or incorporated into the same vessel.

12. The method of claim 1, wherein the volume of the sludge that is pasteurized is from about 0.10 to about 0.50 of the volume of the influent to the first anaerobic reactor.

13. The method of claim 1, wherein the solids content of the sludge of the forming step ranges from about 6 to about 10 weight percent.

14. The method of claim 2, wherein the sludge after injection of steam has a solids content of less than 4 percent by weight.

* * * * *

UNITED STATES PATENT AND TRADEMARK OFFICE
CERTIFICATE OF CORRECTION

PATENT NO. : 6,113,789
DATED : September 5, 2000
INVENTOR(S) : D.A. Burke

It is certified that error appears in the above-identified patent and that said Letters Patent is hereby corrected as shown below:

COLUMN     LINE

8              11             "centrifige," should read --centrifuge,--
(Claim 9,   line 3)

Signed and Sealed this

First Day of May, 2001

NICHOLAS P. GODICI

Attest:

Attesting Officer    Acting Director of the United States Patent and Trademark Office